United States Patent [19]

Rawlings

[11] 4,018,738

[45] Apr. 19, 1977

[54] POLY(BUTYLENETEREPHTHALATE) COMPOSITION WITH NOVACULITE

[75] Inventor: Herbert L. Rawlings, New Martinsville, W. Va.

[73] Assignee: Mobay Chemical Corporation, Pittsburgh, Pa.

[22] Filed: Feb. 6, 1976

[21] Appl. No.: 656,058

[52] U.S. Cl. .............................................. 260/40 R
[51] Int. Cl.² ....................... C08K 3/36; C08K 9/06
[58] Field of Search ............... 260/40 R; 106/288 B

[56] References Cited

UNITED STATES PATENTS

| | | | |
|---|---|---|---|
| 3,290,165 | 12/1966 | Iannicelli | 260/40 R |
| 3,745,140 | 7/1973 | Segal | 260/40 R |
| 3,814,725 | 6/1974 | Zimmerman et al. | 260/40 R |

*Primary Examiner*—Lewis T. Jacobs
*Assistant Examiner*—S. M. Person
*Attorney, Agent, or Firm*—Gene Harsh; Lawrence S. Pope; Frederick H. Colen

[57] ABSTRACT

Mineral filled poly(butyleneterephthalate)s are comprised of a poly(butyleneterephthalate) resin and 10 to 50 percent by weight of a novaculite mineral filler having an average particle size of less than 5 microns. Articles molded from the novaculite filled poly(butyleneterephthalate) exhibit improved impact properties over typical fillers for poly(butyleneterephthalate) resins. Impact properties can be further improved by the addition of a silane coupling agent to the poly(butyleneterephthalate) novaculite blend.

12 Claims, No Drawings

POLY(BUTYLENETEREPHTHALATE) COMPOSITION WITH NOVACULITE

BACKGROUND OF THE INVENTION

1. Field of the Invention

This invention relates to poly(butyleneterepthalate) molded articles and more particularly to mineral filled poly(butyleneterephthalate) molded articles having improved impact properties.

2. Description of the Prior Art

Poly(butyleneterephthalate) polyester resins have recently found utility in the manufacture of molded articles because of their excellent mechanical and physical properties. These thermoplastic polymers are suited for molded articles where impact strength, extensibility, toughness as well as excellent electrical properties are required.

The poly(butyleneterephthalate) resins are used primarily in molded applications to form a unitary article with the desired physical and mechanical properties.

In many instances, it is unnecessary to have the maximum strength imparted by a 100 percent poly(butyleneterephthalate) resin article and proposals have been made to reduce the strength of the poly(butyleneterephthalate) by adding fillers which also reduce the cost of the final article. The balance of reduced cost with reduced physical properties must be somewhat proportionate since small gains in cost reduction with large decreases in impact strength are undesirable.

Typically, a filler level of 10 to 50 percent by weight of the final molded article is acceptable from a cost standpoint, however, typical fillers such as talc, silica, asbestos and similar fillers demonstrate great reductions in impact strength at these filler levels. This degradation in impact and other physical properties is thought to be attributable to the formation of stress concentrations in the vicinity of the individual filler particles causing propagation of cracks in the molded article.

Further, because of the need for effective filler materials, generally, various mineral forms of inorganic compounds have been investigated. One mineral form of silica, novaculite, for example has been found to be not only a filler but also a reinforcer for poly(ethyleneterephthalate), U.S. Pat. No. 3,740,371. This novaculite filler has been used in poly(ethyleneterephthalate) having intrinsic viscosities of 0.28 to 0.97, the filling difficulties in the poly(ethyleneterephthalate) are due to the high melt viscosity of the polymer per se along with further combination with the filler.

Poly(ethyleneterephthalate) differs from poly(butyleneterephthalate) in that the molecular weights encountered with poly(butyleneterephthalate) are higher as measured by intrinsic viscoisities along with the attendant chemical differences. Thus, although a particular filler may be useful for one polymer it may not be effective for another, and hence fillers for poly(ethyleneterephthalate) do not necessarily perform the same in poly(butyleneterephthalate). Thus, in accordance with the present invention a mineral filled poly(butyleneterephthalate) is provided with improved impact strength over conventionally filled poly(butyleneterephthalate)s.

SUMMARY OF THE INVENTION

A filled poly(butyleneterephthalate) is provided with improved impact strength over conventionally filled poly(butyleneterephthalate)s which is comprised of a poly (butyleneterephthtalate) resin and novaculite mineral as a filler. The novaculite filler is incorporated into the composition at a level of 10 to 50 percent by weight based on the combined weight of the novaculite and the poly(butyleneterephthalate) resin. To further improve impact strength the poly(butyleneterephthalate)-novaculite composition may also contain a silane coupling agent.

DETAILED DESCRIPTION OF THE INVENTION

As used herein "poly(butyleneterephthalate) resin" means the neat poly(buytleneterephthalate) resin; "poly (butyleneterehtalate)" means the resin along with any additives including any filler.

The poly(butyleneterephthalate)s to be filled are those which are used in molding applications.

Poly(butyleneterephthalate) is synthesized by either the direct esterification of terephthalic acid and 1,4-butanediol or by the transesterification of dimethyl terephthalate with 1,4-butanediol. In the case of transesterification the reaction sequence is as follows:

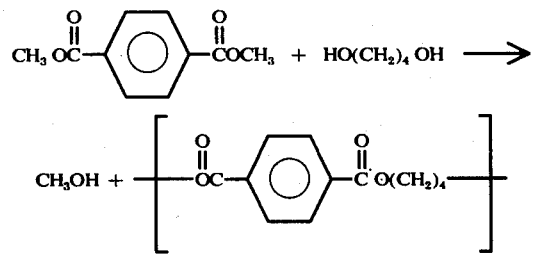

The stoichiometry of the 1–4, butylene glycol to the dimethyl terephthalate and the reaction time is adjusted to obtain the desired degree of polymerization for adequate molding properties of the polymer. Preferably a minimum intrinsic viscosity of 0.6 measured at 25° C as a 0.1% solution in ortho-chlorophenol is necessary to obtain an adequate article formed from poly(butyleneterephthalate). The upper molecular weight is dependent upon processing equipment however a maximum intrinsic viscosity for the poly(butyleneterephthalate) is about 1.5 at 25° C in a 0.1% solution with ortho-chlorophenol. More preferably the intrinsic viscosity of the poly(butyleneterephthalate resin should be between 0.7 and 1.3.

The novaculite mineral filler of the invention comprises 10 to 50 percent by weight of the combined poly(butyleneterephthalate) resin and filler composition. The novaculite mineral is sold under the trade name Novacite® and particularly Novacite L337 and Novacite L207 having an average particle size of less than 5 microns and preferably between 3 and 5 microns and particle size distributions of:

|  | Novacite L207 | Novacite L337 |
|---|---|---|
| 100% under | 10μ | 10μ |
| 50% under | 5μ | 5μ |
| 3% under |  | 1μ |
| 2% under | 2μ |  |

|              | Novacite L207 | Novacite L337 |
|--------------|---------------|---------------|
| Avg. Particle Size | 4μ       | 3.45μ         |

Novaculite is a variety of natural quartz and is distinguished from other silicas. Novaculite does not include silicas which are amorphous such as silica gel, fumed silica and the like. The amorphous silicas were characterized by a high surface area (50–800 m²/g) and high solubility in water (100–140 p.p.m.) at room temperature. Further although there are many forms of natural silica such as tridymite, cristobalite, lechatelierite, chalcedony, opal diatomite and the like; these natural crystalline silicas do not provide filling for poly(butyleneterephthalate)s while maintaining some impact property as well as novaculite.

Novaculite is a unique natural crystalline form of quartz ($SiO_2$) which is found primarily in and around the Devonian-Mississippian deposits of Hot Springs, Ark. Petrographic Analysis of Novaculite shows imperfectly developed subhedral crystals having square and rectangular outlines. These anhedral crystals differ from the characteristic crystalline form of quartz which is in the Trigonal Trapexohedral Class of the Rhombohedral sub-system of the Hexagonal system.

Uniquely novaculite has a minute grain size and individual crystals are usually between about 0.01 to 0.02 millimeter with a maximum of about 0.1 millimeter in size. The index of refraction of novaculite is about 1.550 and it is insoluble in hydrochloric acid. A more extensive description of novaculite is in Dan's System of Minerology by Frondel, Vol. III (1962), Wiley, N.Y. and also in "Petrographic Analysis of Novacite/Novaculite" Malvern Minerals Company, 220 Runyon Street, P. O. Box 1246, Hot Springs National Park, Ark. Also in U.S. Pat. No. 3,740,371 incorporated herein by reference a further description of Novaculite fillers can be found.

The impact properties of the novaculite filled poly(butyleneterphthalate) composition can be further improved by the addition of a silane coupling agent either to the poly(butyleneterephthalate) resin or as a pretreatment to the novaculite. The silane coupling agents are characterized by the structural formula:

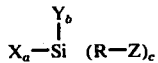

wherein X is a hydrolyzable group, Y is a hydrogen or a monovalent hydrocarbon group, R is a divalent hydrocarbon group having from about 1 to about 20 carbon atoms, Z is a functional group, a is an integer from 1 to 3, b is an interger from 0 to 2, c is an interger from 1 to 3, and the sum a+b+c equals 4. Preferably a is equal to 3, b is equal to 0 and c is equal to 1.

Typical hydrolyzable X groups are halogen and hydroxy groups as well as alkoxy, cycloalkoxy, aryloxy, alkoxy-substituted alkoxy such as B-methoxyethoxy, alkoxycarbonyl, aryloxycarbonyl, alkylcarboxylate, and arylcarboxylate groups, preferably having eight or less carbon atoms. Most preferably X is methoxy or ethoxy. Examples of the Y group are hydrogen, methyl, ethyl, vinyl, isobutyl, phenyl and the like hydrocarbon groups, preferably having 10 or less carbon atoms. The R group can be any divalent hydrocarbon group having up to about 20 carbon atoms or preferably from about 2 to 18 carbon atoms. Typical R groups are ethylene, propylene, butylene, decylene, phenyl and toluyl. In any event the Z group is separated from the Si atoms by at least 2 carbon atoms.

The Z functional group is preferably reactive or at least capable of intimate association with the poly(butyleneterrephthalate) resin. Typical Z groups are amino, epoxy, vinyl, alkyl, methacryloxy and the like, with the preferred Z group being amino or epoxy. Specific examples of coupling agents useful in the practice of the invention are δ-aminopropyltriethoxysilane
δ-aminopropylphenyldimethoxysilane
δ-propionamidotriethoxysilane
N-trimethoxysilypropyl-N (B-amino ethyl)amine
δ-glycidoxypropyltrimethoxysilane
3,4-epoxycyclohexyl-ethyltrimethoxysilane
δ-methacryloxypropyltrimethoxysilane
vinyltrichlorosilane
vinyltrimethoxysilane The silane coupling agent is incorporated into poly(butyleneterephthalate) at a level of up to 2 percent by weight and preferably up to 1 percent by weight based on the weight of the novaculite. The coupling agent may be incorporated into the poly(butyleneterephthalate) by any method which provides homogenity of the poly(butyleneterephthalate) resin, coupling agent and novaculite. For example, the poly(butyleneterephthalate) resin may be tumble blended with the novaculite and the coupling agent. The tumble blend can then be multiple extruded to insure homogenity of the ingredients. In another method the novaculite can be pretreated with the coupling agent and then blended with the poly(butyleneterephthalate) and extruded.

In some uses, pigments may be added to the poly(butyleneterephthalate) to form opaque colored molded products. Predominantly titanium dioxide is used to opacify the poly(butyleneterephthalate) to form a white molded product. If a colored product is desired, pigments such as chrome yellows and oranges, and chrome greens may be added to provide various colors to the article. Also oil soluble dyes may be incorporated into the poly(butyleneterephthalate) to impart color to the final molded article. In order to color the poly(butyleneterephthalate) minimal amounts of colorant i.e. 0.01 to 10g colorant/pound poly(butyleneterephthalate) are necessary.

The following examples will further illustrate the invention, however these examples are not intended to limit the invention.

EXAMPLE I

A poly(butyleneterephthalate) resin in pellet form having an intrinsic viscosity of 0.98 measured at 25° C as a 0.1% solution in ortho-chlorophenol was tumble blended with novaculite having an average article size of 3.45 microns and a particle size distribution as follows:

| 100% under | 10μ |
| 50% under  | 5μ  |
| 3% under   | 1μ  |

The novaculite was incorporated into the poly(butyleneterephthalate) at a level of 30 percent by weight based on the combined weight of poly(butyleneterephthalate) resin and novaculite. The tumble blend was melt extruded into strands, cooled and chopped into pellets for molding. Samples were molded for impact and heat distortion testing. Test results along with the test results of the following examples are reported on Table I.

EXAMPLE II

Example I was repeated except that 1 percent by weight based on the weight of novaculite of 8-aminopropyltrimethoxysilane was tumble blended along with the resin and novaculite.

EXAMPLE III

Example I was repeated except that a filler grade of amorphous silica was used in place of novaculite.

EXAMPLE IV

Example I was repeated substituting wollastonite for novaculite.

EXAMPLE V

Example V is a control having no filler therein.

TABLE I

| Example | Filler | Filler Concn. (%) | Izod Notched ⅛″ Impact ft. lb/in | Dart Drop Ft./lb | Heat Distortion Temp.° C |
|---|---|---|---|---|---|
| I | Novaculite | 30 | 1.1 | 36 | 75 |
| II | Novaculite with silane | 30 | 1.0 | 75 | 121 |
| III | Silica | 30 | 1.1 | 8 | 70 |
| IV | Wollastonite | 30 | 1.2 | 2 | 91 |
| V | None | 0 | 0.9 | 107 | 58 |

The dart drop impact tests were conducted by molding 4 inch diameter discs having a thickness of 0.125 inch. The discs were mounted on a surface and a 10.43 pound weight having a 1 inch steel ball bearing tip thereon was dropped onto the disc at various heights. The height at which fifty percent of the specimens failed multiplied by the weight of the dart was recorded as the impact value.

As is shown by Table I poly(butyleneterephthalate)s filled with novaculite were superior to those filled with wollastonite or silica. Further, an increase in heat distortion temperature is encountered with the filled compositions.

Although the invention has been described with reference to specific materials and conditions it is not to be limited, only as is set forth in the accompanying claims.

What is claimed is:
1. A filled synthetic resinous composition comprising 50 to 90 percent by weight of
   a. poly(butyleneterephthalate) resin characterized by the repeating structural formula:

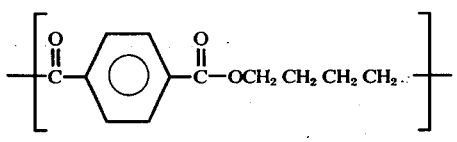

said poly(butyleneterephthalate) having an intrinsic viscosity of 0.6 to 1.5; and,
   b. from 10 to 50 percent by weight novaculite having an average particle size of up to 5 microns.
2. The composition of claim 1 wherein said novaculite has a particle size of less than 10 microns.
3. The composition of claim 1 wherein said poly(butyleneterephthalate) has an intrinsic viscosity of 0.7 to 1.3.
4. The composition of claim 1 wherein said novaculite is present from 20 to 50 percent by weight and said poly(butyleneterephthalate) is present from 50 to 80 percent by weight.
5. The composition of claim 1 including up to 2 percent by weight of a silane coupling agent.
6. The composition of claim 5 wherein said coupling agent is gamma-aminopropyltrialkoxysilane.
7. A synthetic resinous composition comprising:
   a. from 50 to 90 percent by weight of poly(butyleneterephthalate) characterized by the repeating structural formula:

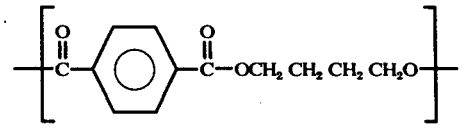

said poly(butyleneterephthalate) having an intrinsic viscosity of 0.6 to 1.5; and,
   b. an inorganic filler consisting essentially of 10 to 50 percent by weight novaculite having an average particle size of less than 5 microns.
8. The composition of claim 7 wherein said novaculite has a particle size of less than 10 microns.
9. The composition of claim 7 wherein said poly(butyleneterephthalate) has an intrinsic viscosity of 0.7 to 1.3.
10. The composition of claim 7 wherein said novaculite is present from 20 to 50 percent by weight and said poly(butyleneterephthalate) is present from 50 to 80 percent by weight.
11. The composition of claim 7 including up to 2 percent by weight of a silane coupling agent.
12. The composition of claim 11 wherein said coupling agent is gamma-aminopropyltrialkoxysilane.

* * * * *